(12) United States Patent
Choe et al.

(10) Patent No.: US 10,530,706 B2
(45) Date of Patent: Jan. 7, 2020

(54) ARBITRATING CONTROL ACCESS TO A SHARED RESOURCE ACROSS MULTIPLE CONSUMERS

(71) Applicant: Microsoft Technology Licensing, LLC, Redmond, WA (US)

(72) Inventors: Sang K. Choe, Redmond, WA (US); Sathyanarayanan Karivaradaswamy, Sammamish, WA (US); Mei Ling Wilson, Redmond, WA (US); Fabin Shen, Sammamish, WA (US); Aleksey S. Kabanov, Redmond, WA (US); Casey J. Dvorak, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 244 days.

(21) Appl. No.: 15/198,229

(22) Filed: Jun. 30, 2016

(65) Prior Publication Data
US 2017/0279737 A1 Sep. 28, 2017

Related U.S. Application Data

(60) Provisional application No. 62/313,694, filed on Mar. 25, 2016.

(51) Int. Cl.
*H04L 12/927* (2013.01)
*H04L 12/24* (2006.01)
*H04L 29/08* (2006.01)

(52) U.S. Cl.
CPC ............ *H04L 47/803* (2013.01); *H04L 41/12* (2013.01); *H04L 67/02* (2013.01)

(58) Field of Classification Search
CPC .................................................... H04L 47/803
See application file for complete search history.

(56) References Cited

U.S. PATENT DOCUMENTS 5,442,749 A 8/1995 Northcutt et al.
6,161,169 A 12/2000 Cheng
(Continued)

FOREIGN PATENT DOCUMENTS

EP 0629947 A2 12/1994
WO WO 2006/015252 A1 2/2006

OTHER PUBLICATIONS

International Patent Application No. PCT/US2017/023277; Int'l Search Report and the Written Opinion; dated Jul. 6, 2017; 16 pages.
(Continued)

*Primary Examiner* — Suraj M Joshi
(74) *Attorney, Agent, or Firm* — Newport IP, LLC; Han Gim (57) ABSTRACT

Techniques for arbitrating control access to a shared resource among multiple client applications concurrently consuming a shared data stream associated with the shared resource are described. A server component instantiates a shared resource component representing the shared resource and associated shared data stream. The server component publishes a shared resource interface that provides central interface for the multiple client applications to access the shared resource and associated shared data stream. Each client application may access the shared resource in either control mode or shared mode to consume the shared data stream. In control mode, the client application has read-write access to control parameters representing a configuration of the shared resource that are usable to modify aspects of the shared data stream. In shared mode, the client application has read-only access to the control parameters.

19 Claims, 6 Drawing Sheets

(56) References Cited

U.S. PATENT DOCUMENTS

| | | |
|---|---|---|
| 8,284,267 B2 | 10/2012 | Wang et al. |
| 8,635,656 B2 | 1/2014 | Huang et al. |
| 8,650,550 B2 | 2/2014 | Carrara et al. |
| 8,675,084 B2 | 3/2014 | Bolton et al. |
| 9,053,337 B2 | 6/2015 | Carrara et al. |
| 2003/0105796 A1* | 6/2003 | Sandri .................. G06F 9/5011 718/104 |
| 2004/0255086 A1 | 12/2004 | Sengdan |
| 2006/0050155 A1 | 3/2006 | Ing et al. |
| 2010/0083268 A1* | 4/2010 | Morris .................. G06F 9/526 718/104 |
| 2010/0122165 A1 | 5/2010 | Uberti |
| 2011/0307831 A1 | 12/2011 | Cowan et al. |
| 2012/0079495 A1* | 3/2012 | Conti ...................... G06F 9/526 718/104 |
| 2015/0222762 A1 | 8/2015 | Jia et al. |
| 2015/0286563 A1 | 10/2015 | Narasimhamurthy |
| 2017/0237788 A1* | 8/2017 | Xi ........................ H04L 65/4015 709/204 |

OTHER PUBLICATIONS

Nakodari, Ghaus Iftikhar, "How to Split a Webcam Between Multiple Applications Easily", Published on: Feb. 23, 2009 Available at: http://www.addictivetips.com/windows-tips/how-to-split-a-webcam-between-multiple-applications-easily/.

\* cited by examiner

ARBITRATING CONTROL ACCESS TO A SHARED RESOURCE ACROSS MULTIPLE CONSUMERS

CROSS REFERENCE TO RELATED APPLICATIONS

This application claims priority to U.S. Provisional Patent Application No. 62/313,694, filed Mar. 25, 2016, the content of which is incorporated herein by reference in its entirety.

BACKGROUND

Conventional techniques for arbitrating control access to a shared resource among multiple client applications typically rely on a first come first served priority system. Only one client application is provided with exclusive control access to the shared resource at a time. Granting exclusive control access to one client application at a time prevents such things as the shared resource simultaneously receiving conflicting commands. However, the remaining client applications seeking access to the shared resource must wait until that client application relinquishes control of the shared resource.

DETAILED DESCRIPTION OF EMBODIMENTS

Various aspects of the technology described herein are generally directed to systems, methods, and computer-readable storage media for, among other things, interfacing event detectors with a network interface. As used herein, "connected device" refers to a device having network connectivity that is configured to communicate with other computing devices via one or more networks (e.g. network 150 of FIG. 1). That is, a connected device is capable serving as an endpoint, connection point, and/or a redistribution point of a communication session communicatively coupling the connected device with one or more computing nodes of a network. In contrast, "unconnected device" refers to a device lacking network connectivity that is not configured to communicate with other devices via one or more networks. In an embodiment, an "event detector" is an unconnected device.

The subject matter of this patent is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. One skilled in the art can appreciate that the example components discussed herein provide an operational framework for describing the present invention. The components are communicatively coupled to each other in a manner appropriate for carrying out their respective function within the operational framework. Moreover, the components are described in brief with an emphasis on function for the sake of simplicity and to avoid obscuring relevant aspects used to implement the present invention.

Furthermore, although the terms "step," "block," or "component," etc., might be used herein to connote different components of methods or systems employed, the terms should not be interpreted as implying any particular order among or between various steps herein disclosed unless and except when the order of individual steps is explicitly described. As such, the examples provided are not intended to suggest any limitation as to the scope of use or functionality of the present invention. Neither should the examples provided be interpreted as having any dependency or requirement relating to any single component or combination of components depicted.

Various aspects of the technology described herein are generally directed to systems, methods, and computer-readable storage media for, among other things, arbitrating control access to a shared resource among multiple client applications concurrently consuming a shared data steam associated with the shared resource. In general, a "shared data stream" refers to a sequence of atomic data units (e.g. frame, packet, audio sample, etc.) and metadata associated with each atomic data unit that is compiled from data generated by one or more shared resources.

A "shared resource" generally refers to a collection of configurable data streams for concurrent consumption by multiple client applications. Source data for the collection of configurable data streams may originate from one or more physical devices, individual pins of a physical device, logical data sources, or a combination thereof. Examples of physical resources include cameras, microphones, video recorders, sensors, and the like. Examples of logical resources include services, processes, threads, pipes, network streams, other applications reading from source data files, data structures, and the like.

As used herein, "client application" refers to an application, processes, or threads executing processes that consuming a shared data stream associated with a shared resource. A client application can request a service (e.g. a shared data stream) provided by another program or process (e.g. a shared resource). The client application utilizes the requested service without having to "know" any working details about the other program or the service itself. A client application subscribing to a shared data stream associated with a shared resource with intent to exclusively control the shared data stream is a "controlling application". A client application subscribing to a shared data stream associated with a shared resource with intent to obtain a read-only access to the shared data stream and stream-related configuration data is a "sharing application".

As used herein "server component" refers to a mechanism that provides a uniform interface that binds suppliers (i.e. shared resources) and consumers (i.e. client applications) of shared data streams. Providing the uniform interface enables the server component to provide multiple client applications with concurrent access to a shared data stream while arbitrating access to controls that modify aspects of the shared data stream (e.g. frame rate, exposure, scaling, resolution, and the like).

With a shared resource being configurable and adapted for concurrent consumption by multiple client applications, modifications of the shared resource by any client application impacts all client applications consuming a shared data stream associated with the shared resource. Furthermore, one client application may attempt to configure a shared resource to modify a shared data stream associated with the shared resource according to its particular requirements. Simultaneously, another client application may attempt to configure that same shared resource differently. Two client applications simultaneously attempting to reconfigure one shared resource may result in conflict.

Having briefly described an overview of embodiments of the invention, an example of a computing environment suitable for implementing the embodiments is described below. Referring to the figures generally and initially to FIG. 1 in particular, an exemplary computing environment in which embodiments of the present invention is depicted and generally referenced as computing environment 100. As utilized herein, the phrase "computing environment" generally refers to a dedicated computing device with processing power and storage memory, which supports operating software that underlies the execution of software, applications, and computer programs thereon.

Figure 1:
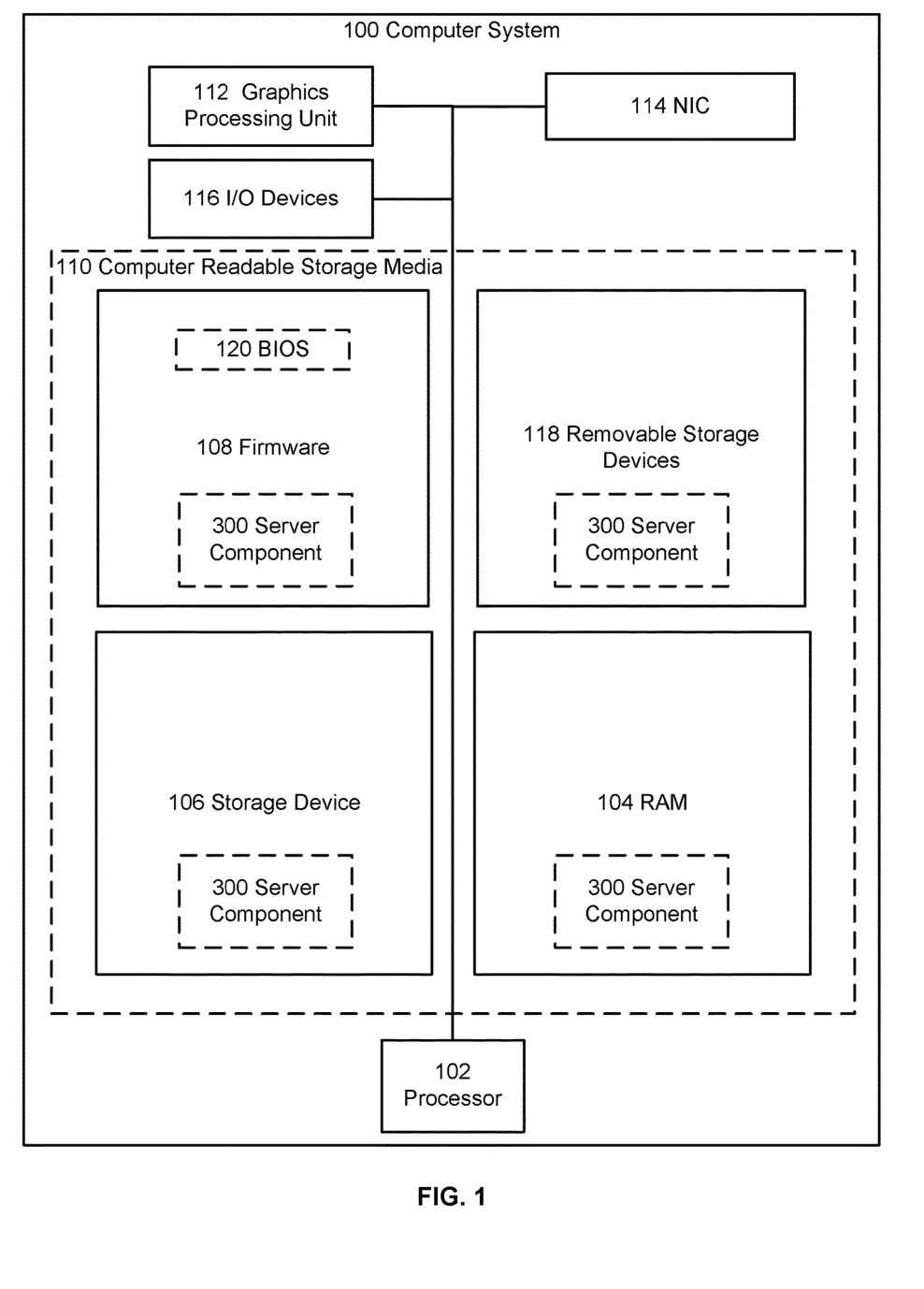
FIG. 1 depicts an example general purpose computing environment in which embodiments of the invention may be implemented.

As shown by FIG. 1, computing environment 100 includes processor 110 (e.g., an execution core) that is interconnected by one or more system buses that couple various system components to processor 110. While one processor 110 is shown in the example depicted by FIG. 1, one skilled in the art will recognize that computing environment 100 may have multiple processors (e.g., multiple execution cores per processor substrate and/or multiple processor substrates each having multiple execution cores) that each receive computer-readable instructions and process them accordingly. The one or more system buses may be any of several types of bus structures including a memory bus or memory controller, a peripheral bus, and a local bus using any of a variety of bus architectures. In an embodiment, computing environment 100 also includes a host adapter, Small Computer System Interface (SCSI) bus, and an external storage device connected to the SCSI bus.

Computing environment 100 also typically includes or has access to various computer-readable media. Computer-readable media is any available media accessible to computing environment 100 that embodies computer-readable, processor-executable instructions. By way of example, and not limitation, computer-readable media includes computer-readable storage media 110 and communication media. Aspects of the present disclosure are implemented by way of computer-readable, processor-executable instructions that are stored on or transmitted across some form of computer-readable media.

Communication media typically embodies computer-readable instructions, data structures, program modules or other data in a modulated data signal such as a carrier wave or other transport mechanism and includes any information delivery media. "Modulated data signal", as used herein, refers to a signal having one or more characteristics that each may be configured or modified to encode data into the signal for propagation through a communication channel. Examples of such communication channels include wired media such as a wired network or direct-wired connection, and wireless media such as acoustic, RF, infrared and other wireless media.

Computer-readable storage media 110 can include, for example, random access memory ("RAM") 104; storage device 106 (e.g., electromechanical hard drive, solid state hard drive, etc.); firmware 108 (e.g., FLASH RAM or ROM); and removable storage devices 118 (e.g. CD-ROMs, floppy disks, DVDs, FLASH drives, external storage devices, etc). It should be appreciated by those skilled in the art that other types of computer-readable storage media can be used such as magnetic cassettes, flash memory cards, and/or digital video disks. Generally, such computer-readable storage media can be used in some embodiments to store processor executable instructions tangibly embodying aspects of the present disclosure. Consequently, computer-readable storage media explicitly excludes signals per se.

Computer-readable storage media 110 can provide non-volatile and/or volatile storage of computer-readable, processor-executable instructions, data structures, program modules and other data for computing environment 100. A basic input/output system ('BIOS") 120, containing the basic routines that help to transfer information between elements within computing environment 100, such as during start up, can be stored in firmware 108. A number of programs may be stored on firmware 108, storage device 106, RAM 104, and/or removable storage devices 118. These programs can include an operating system and/or application programs. In a specific embodiment, computer-readable storage media 110 of a computing environment 100 can store server component 220, which is described in more detail in the following paragraphs. In this example embodiment, server component 220 can be executed by processor 110 thereby transforming computing environment 100 into a computer environment configured for a specific purpose, i.e., a computer environment configured according to techniques described in this disclosure.

With continued reference to FIG. 1, commands and information may be received by computing environment 100 through input/output devices ("I/O devices") 116. I/O devices 116 include one or more input devices, output devices, or a combination thereof. Examples of input devices include a keyboard, a pointing device, a touchpad, a touchscreen, a scanner, a microphone, a joystick, and the like. Examples of output devices include a display device, an audio device (e.g. speakers), a printer, and the like. These and other I/O devices are often connected to processor 110 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit.

Computing environment 100 may operate in a networked environment and receive commands and information from one or more remote computers via logical connections to the one or more remote computers, such as a remote computer. The remote computer may be another computer, a server, a router, a network PC, a peer device or other common network node, and typically can include many or all of the elements described above relative to computing environment 100.

When used in a LAN or WAN networking environment, computing environment 100 can be connected to the LAN or WAN through network interface card ("NIC") 114. NIC 114, which may be internal or external, can be connected to the system bus. In a networked environment, program modules depicted relative to computing environment 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

In a networked environment, program modules depicted relative to computing environment 100, or portions thereof, may be stored in a remote memory storage device accessible via NIC 114. It will be appreciated that the network connections shown are exemplary and other means of establishing a communications link between the computers may be used. In an embodiment where computing environment 100 is configured to operate in a networked environment, the operating system is stored remotely on a network, and computing environment 100 may netboot this remotely-stored operating system rather than booting from a locally-stored operating system. In an embodiment, computing environment 100 comprises a thin client having an operating system that is less than a full operating system, but rather a kernel that is configured to handle networking and display output.

Figure 2:
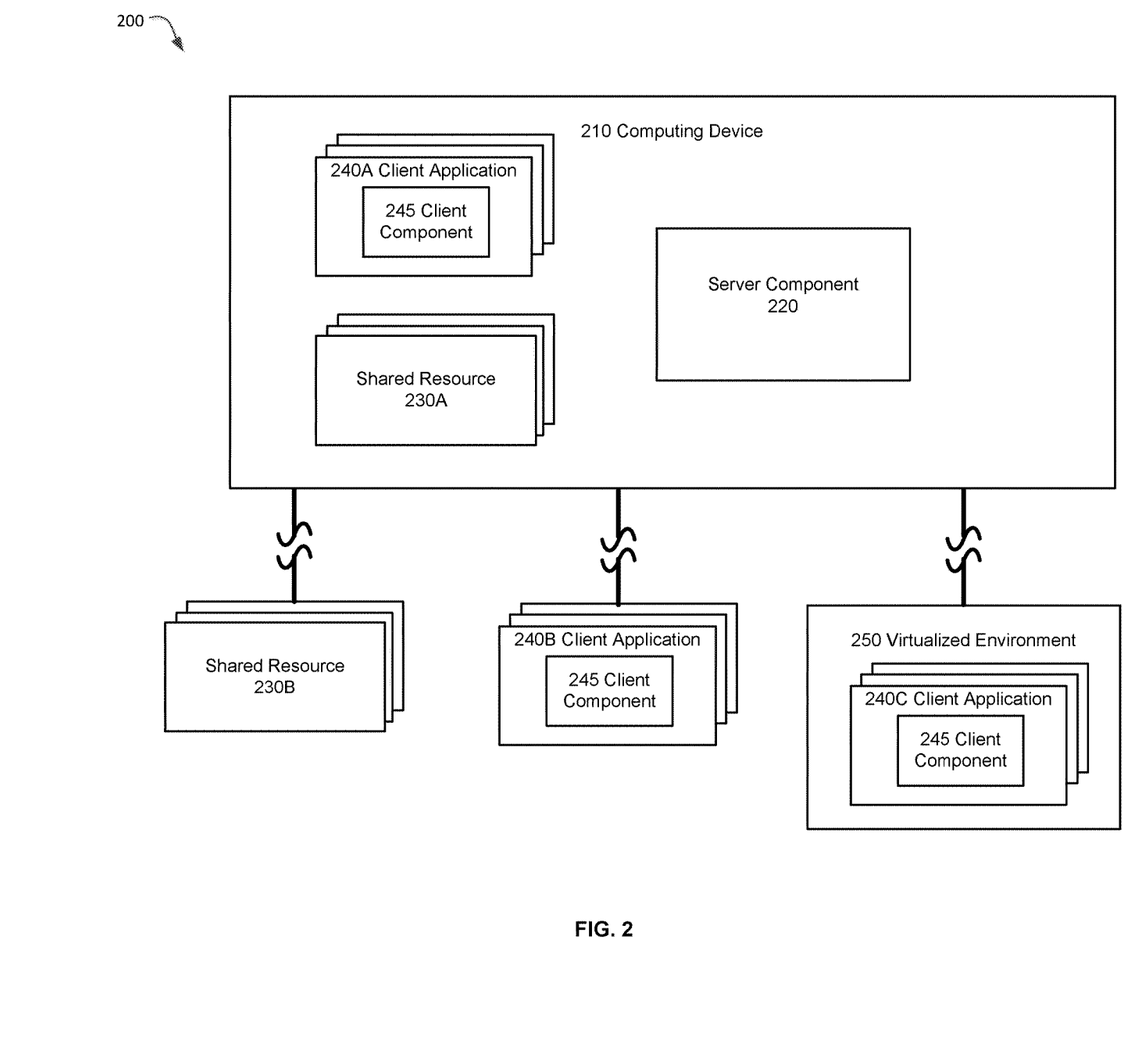
FIG. 2 depicts an example operational environment for implementing aspects of the present invention.

Turning now to FIG. 2, an example of an operational environment suitable for implementing aspects of the present invention is depicted and generally referenced as operational environment 200. For instance, server component 220 may implement methods 400 and 500 of FIGS. 4 and 5, respectively, whereas one or more of client applications 240A and 240B may implement method 600 of FIG. 6. One skilled in the art can appreciate that the example elements depicted by FIG. 2 are illustrated to provide an operational framework for describing the present invention. Accordingly, in some embodiments the physical layout of each environment may be different depending on different implementation schemes. Thus, the example operational framework is to be treated as illustrative only and in no way limit the scope of the claims.

Operational environment 200 includes computing device 210 that is comprised of circuitry configured to effectuate server component 220 for arbitrating control access to shared resources (e.g. shared resources 230A-230B) generating data streams concurrently consumed by the multiple client applications (e.g. client applications 240A-240C). In an embodiment, computing device 210 is implemented in a computing environment similar to computing environment 100 of FIG. 1. Computing device 210 can be implemented as any device capable of processing machine-readable instructions. Examples of suitable devices for implementing computing device 210 include a desktop computer, a laptop computer, a smartphone, a notepad computer, a game console, an entertainment appliance, and the like.

The shared resources that generate data streams concurrently consumed by the multiple client applications include any combination of shared resources that are internal to computing device 210 (e.g. shared resources 230A) or external to computing device 210 (e.g. shared resources 230B). As discussed above, a shared resource refers to a collection of configurable data streams for concurrent consumption by multiple client applications. Stated differently, a shared resource refers a controllable data source accessible to multiple client applications via application program interfaces ("APIs"). A shared resource may be implemented by any combination of hardware, software, and firmware.

Shared resources 230B external to computing device 210 are communicatively coupled to computing device 210 through various communication channels. For example, shared resources 230B may be communicatively coupled to computing device 210 indirectly using networked connections, such as the Internet, a local area network, a wide area network, a telecommunication network, an intranet, and the like. Shared resources 230B may also be communicatively coupled to computing device 210 directly using any combination of wired or wireless communication means, such as universal serial bus, infrared connections, Bluetooth connections, and the like.

Client applications (e.g. client applications 240A, 240B, and 240C) accessing shared resources in operational environment 200 elect to access particular shared resources in either a control mode or a shared mode. Stated different, access mode election by client applications in operational environment 200 is done at a shared resource level. In an embodiment, client applications submit resource creation requests to server component 220 for customized shared resources or shared data streams not previously presented by server component 220. Upon subscribing to a shared data stream associated with a shared resource, all client applications are capable of consuming the shared data stream.

A client application accessing the particular shared resource in the control access mode is a controlling application. A controlling application being capable of issuing commands that change control parameters associated with the shared resource and the shared data stream. By changing such control parameters, the controller application is capable of modifying the shared data stream for all other client applications consuming the shared data stream. In contrast, a client application accessing the particular shared resource in the shared access mode is a sharing application. A sharing application is capable of reading control parameters associated with the shared resource and the shared data stream.

Client applications access shared resources in operational environment using client components (client component 245) exposed in each client application's corresponding process space. Client component 245 serves as a proxy object encapsulating data for marshalling between a process space of server component 220 and the corresponding client application's process space. In an embodiment, client component 245 represents a shared resource and its associated shared data streams in the corresponding client application's process space. In an embodiment, client component 245 submits resource creation requests to server component 220. Upon initializing, client component 245 establishes a streaming connection with server component 220. Client component 245 serves as a client-side endpoint of the streaming connection between a corresponding client application's process space and the process space of server component 220. In an embodiment, client component 245 communicates with a server-side endpoint of the streaming connection associated with server component 220 using remote procedure calls ("RPCs") or remote method invocations ("RMIs").

In an embodiment, at least one client application among the multiple client applications consuming a shared data stream is a local application (e.g. client application 230A) comprising one or more components installed on computer-readable storage media within computing device 220 (e.g. RAM 104, storage device 106, or firmware 108 of FIG. 1). In an embodiment, at least one client application among the multiple client applications consuming a shared data stream is a portable application (e.g. client application 230B) comprising one or more components installed on computer-readable storage media external to computing device 220 (e.g. removable storage device 118 of FIG. 1). In an embodiment, at least one client application among the multiple client applications consuming a shared data stream is a virtualized application (e.g. client application 230C) running in a virtualized environment 260 communicatively coupled to computing device 210 via a network connection. For example, client application 230C may be a virtualized application deployed within a session-based desktop environment or a virtual machine-based desktop environment.

Figure 3:
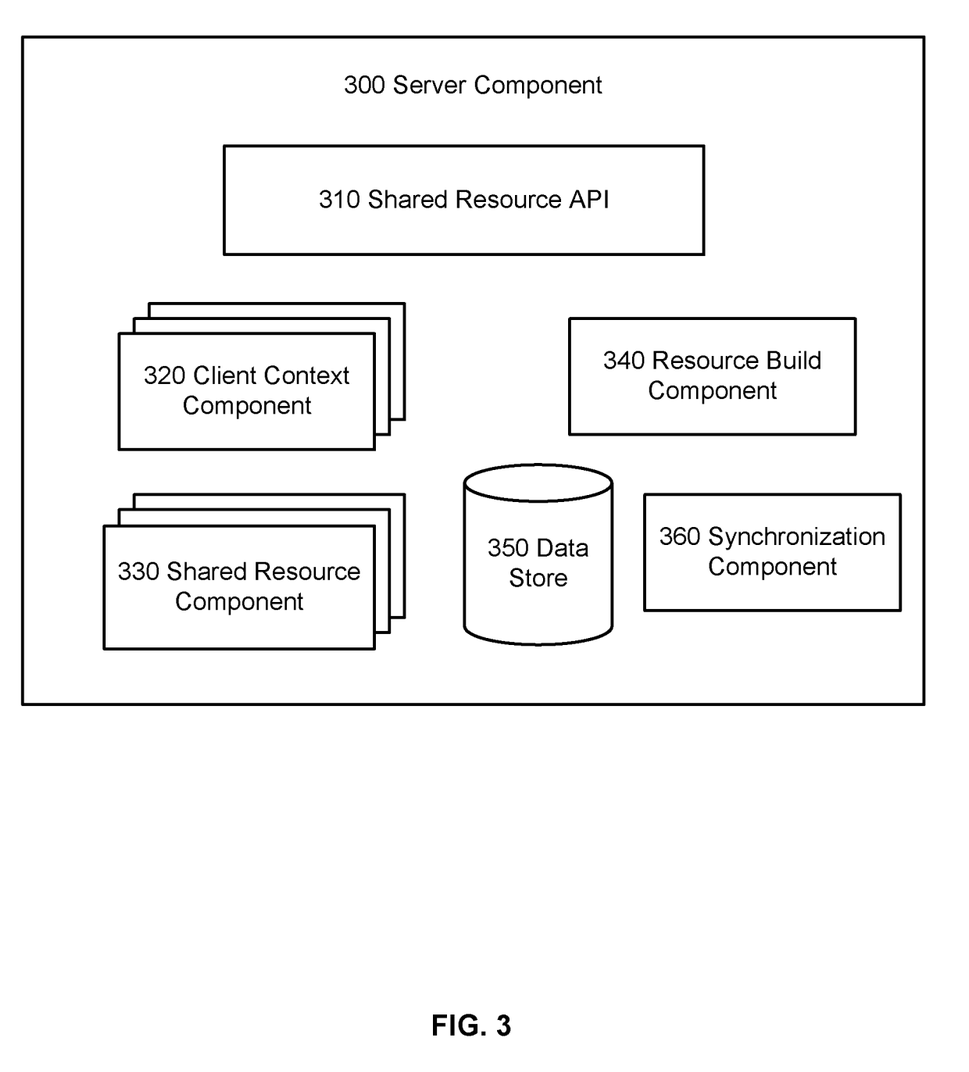
FIG. 3 depicts an example of a server component for implementing aspects of the present invention.

FIG. 3 depicts an example of a server component 300 for implementing aspects of the present invention. Specifically, sever component 300 is illustrated as including several example components. One skilled in the art will recognize that in some applications server component 300 may be represented by more or fewer components, and that the example components are provided for explanatory purposes. In an embodiment, server component 300 is implemented in an operational environment similar to operational environment 200 of FIG. 2. As shown in the embodiment depicted by FIG. 3, server component 300 includes shared resource API 310, client context component 320, shared resource component 330, resource build component 340, data store 350, and synchronization component 360.

Server component 300 publishes (or exposes) shared resource API 310 to multiple client applications (e.g. client applications 230A, 230B, and 230C of FIG. 2) to provide a central interface for the multiple client applications to identify and access shared resources. In order to access a shared data stream associated with a particular shared resource, a client application invokes shared resource API 310 through a client component (e.g. client component 235 of FIG. 2). Shared resource API 310 is configured to facilitate establishing streaming connections between server component 300 and the multiple client applications for data streaming sessions.

In addition, shared resource API 310 facilitates adding data streams to the data streaming sessions, controlling shared data stream states, issuing commands from controlling applications that modify control parameters associated with shared data streams, and communicating shared resource events from server component 300 to client applications. A streaming connection providing read-write access to control parameters associated with a shared data stream received via the streaming connection is a "controlling connection". A streaming connection providing read only access to control parameters associated with a shared data stream received via the streaming connection is a "sharing connection".

For each streaming connection established with a client application, server component 300 creates and maintains a corresponding client context component 320. Client context component 320 includes relevant information about its corresponding streaming connection, the client application connected by that streaming connection, and a shared resource serving the client application via that streaming connection. Such relevant information may include whether the corresponding streaming connection is a controlling connection or a sharing connection. As another example, client context component 320 may include information about a shared data stream being served via the corresponding connection, a shared resource associated with that shared data stream, a client application consuming that shared stream, or a combination thereof.

Server component 300 also includes a shared resource component 330 for each shared resource that client applications access via shared resource API 310. Each shared resource component 330 represents a particular shared resource and its associated shared data streams. Shared resource component 330 interacts with kernel mode components as directed by resource builder component to initialize the particular shared resource. In addition, shared resource component interacts with kernel mode components to determine capabilities and attributes of the particular shared resource and its associated shared data streams. In an embodiment, shared resource component 330 represents a particular shared resource and its associated shared data streams in a process space of server component 300.

Shared resource component 330 exposes those capabilities and attributes as control parameters associated with that shared resource and its associated shared data streams. Client applications accessing that shared resource and its associated shared data streams are provided access to the control parameters of via shared resource API 310. In an embodiment, control parameters include capabilities and attributes of the shared resource and its associated shared data streams. In an embodiment, the capabilities and attributes are each composed of a plurality of capability subsets and attribute subsets, respectively. A controlling application is provided with read-write access to control parameters, thereby enabling the controlling application to modify the control parameters. In contrast, a sharing application is provided with read only access to control parameters, thereby enabling the sharing application to monitor the capabilities and attributes of the shared resource.

By way of example, a particular shared resource component 330 may represent a camera. Control parameters of that shared resource component 330 include capabilities representing mutable properties associated with the camera and attributes associated with immutable properties associated with the camera. A plurality of capability subsets composing the camera capability control parameters may include a sensor capability subset, an image signal processor capability subset, a post-processing capability subset, a stream capability subset, and a general driver capability subset. The sensor capability subset being usable to modify such capabilities associated with the camera as exposure, resolution, frame rate, and the like. The image signal processor capability subset being usable to modify such capabilities associated with the camera as scaling, histogram creation, face detection, and the like. The post-processing capability subset being usable to modify such capabilities associated with the camera as digital image stabilization, red eye reduction, and the like. The stream capability subset being usable to modify such capabilities associated with the camera as frame rate, stream type, and the like. The general driver capability subset being usable to modify such capabilities associated with the camera as variable photo sequence support, multiple stream support, and the like.

A plurality of attribute subsets composing the camera attribute control parameters may include an extrinsic attribute subset and an intrinsic attribute subset. The extrinsic attribute subset being usable to determine such attributes associated with the camera as a physical location of the camera with respect to a camera housing enclosing the camera, an orientation of the camera relative to the camera housing, an orientation of the camera relative to other cameras, and the like. The intrinsic attribute subset being usable to determine such attributes associated with the camera as a lens distortion model, thermal characteristic co-efficient of the camera's lens, and the like.

Resource build component 340 manages shared resource components 330 in server component 300 using data store 350. In response to an access request or resource creation request from a client application, resource build component 340 accesses data store 350 to determine whether a shared resource component matching those requests exists. If a matching shared resource component exists, resource build component 340 subscribes a client context component 320 associated with the client application submitting those requests to the matching shared resource component. If a matching shared resource component does not exist, resource build component 340 instantiates a new shared resource component satisfying the requests. In addition, resource build component 340 updates data store 350 to include the new shared resource component.

As an example, a first client application may submit a first access request to resource build component 340 requesting access to a shared resource associated with a shared data stream collectively composed of a visible spectrum image data stream, a depth image data stream, and a N-point skeletal data stream. In response to the first access request, resource build component 340 may access data store 350 to determine whether a shared resource component exists that matches the access request. If a matching shared resource does not exist, resource build component 340 may instantiate a new shared resource component (e.g. shared resource component 330) that matches the first access request.

In this example, the shared data stream is collectively composed of a visible spectrum image data stream, a depth image data stream, and a N-point skeletal data stream may utilize multiple data outputs generated by an assortment of physical resources, logical resources, or a combination thereof. As such, resource build component 340 may instantiate the new shared resource component by mapping output data pins associated with multiple discrete data sources to the new shared resource component. For example, this mapping of output data pins may be implemented using a data structure composing the new shared resource component.

This mapping of output data pins by resource build component 340 may include mapping an output data pin of a visible spectrum image device (e.g. an RGB camera) to a first stream of a new shared data stream associated with the new shared resource component. This mapping may also include mapping an output data pin of a depth image device to a second stream of the new shared data stream. Furthermore, resource build component 340 may map an output data stream of another process generating an N-point skeletal data stream to a third stream of the new shared data stream. Upon mapping these output data pins to the new shared data stream, resource build component 340 may update data store 350 to include the new shared resource component associated with the new shared data stream.

Server component 300 may subscribe the first client application submitting the first access request to the new shared resource component via shared resource API 310. The first client application may then consume the new shared data stream. In an embodiment, the first client application submitting the access request may instantiate a new client component associated with the new shared resource in the first client application's process space (e.g. client component 245 of FIG. 2). In an embodiment, server component 300 may instantiate a new client context component corresponding to the new client component in the first client application's process space. In an embodiment, subscribing the first client application to the new shared resource component may include associating the new client context component to the new shared resource component.

A second client application may subsequently submit a request to access the new shared resource component via shared resource API 310. In response, resource build component 340 may access data store 350 and determine that a shared resource component matching the request submitted by the second client application exists. Server component 300 may subscribe the second client application to the new shared resource component via shared resource API 310. The first client application and the second client application may then concurrently consume the new shared data stream.

Synchronization component 360 enables server component 300 to reduce conflicts resulting from multiple client applications simultaneous issuing commands that modify the same shared resource. For example, server component 300 may reference synchronization component 360 upon receiving a command that modifies a shared data stream before forwarding the command to a shared resource component 330 associated with the shared data stream. In an embodiment, synchronization component 360 is implemented using known synchronization objects. Examples of suitable synchronization objects include: mutex object, a semaphore object, an event pair object, an event object, a timer object, and a thread object. In an embodiment, server component 300 queries synchronization component 360 to determine whether another client application has exclusive control of a particular shared resource. In an embodiment, server component 300 queries synchronization component 360 to determine whether another client application has exclusive control of a particular control component associated with a particular shared resource.

Figure 4:
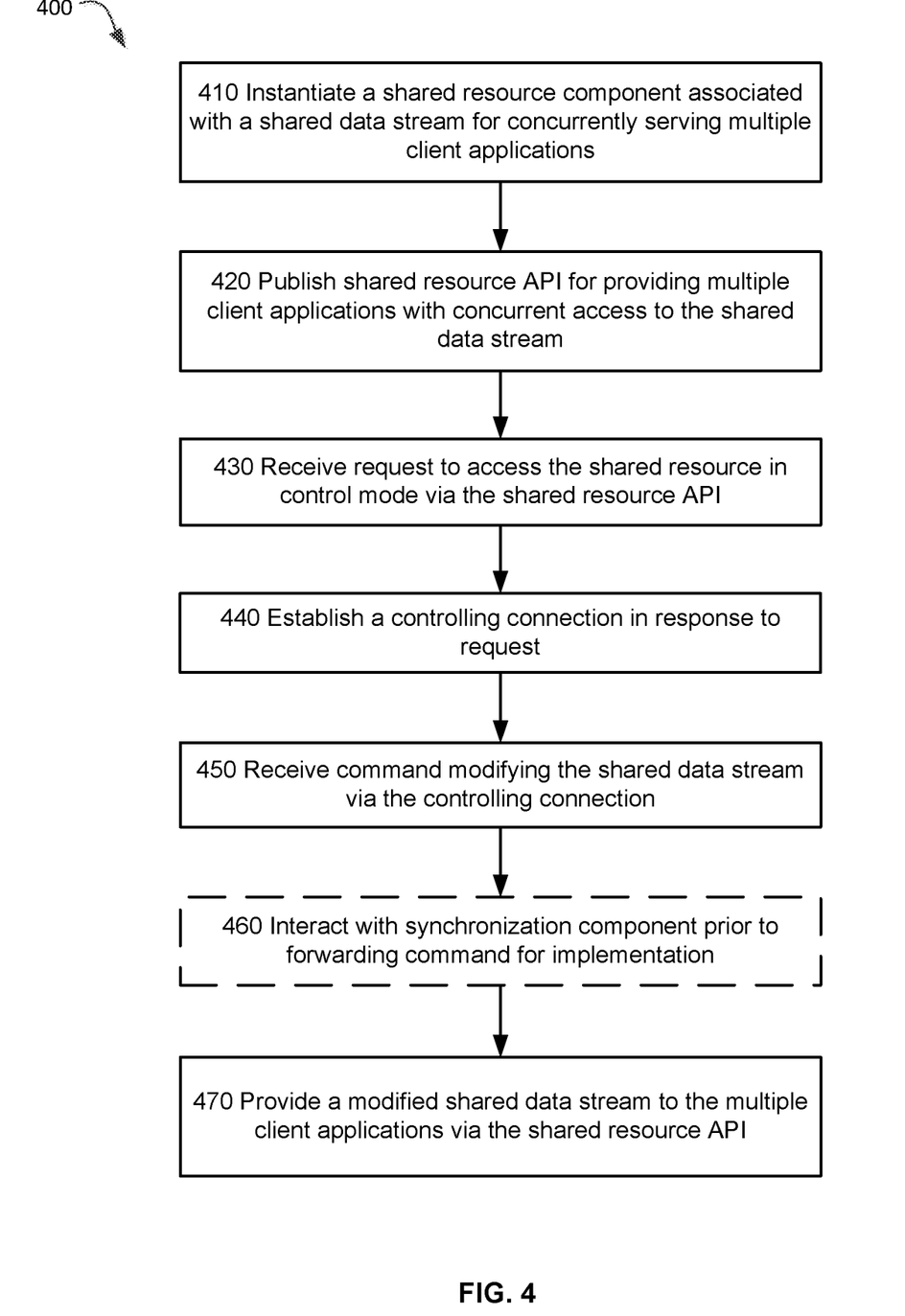
FIG. 4 depicts an embodiment of a method for arbitrating control access among multiple client applications concurrently consuming a shared data steam associated with a shared resource.

FIG. 4 depicts an embodiment of a method 400 for arbitrating control access to a shared resource concurrently serving multiple applications. In embodiments, method 400 may be effectuated by server component 220 of FIG. 2, as it arbitrates access control to shared resource (e.g. shared resources 230A and 230B) among multiple client applications (e.g. client applications 240A-240C). It may be appreciated that, with respect to FIGS. 4-6, there are embodiments of the invention that do not implement all of the depicted operations, or that implement the depicted operations in a different order than is described herein.

In step 410, a server component instantiates a shared resource component (e.g. shared resource component 330 of FIG. 3) representing a shared resource and associated shared data streams. The shared resource configured to generate data associated with a shared data stream for concurrently serving multiple client applications. Resource build component 340, as discussed above with respect to FIG. 3, interacts with kernel mode components to initialize a shared resource. In an embodiment, instantiating the shared resource component includes the server component acquiring exclusive control of the shared resource.

In step 420, the server component publishes a shared resource API for providing multiple client applications with concurrent access to the shared data stream associated with the shared resource. In an embodiment, a shared resource API provides a central interface for the multiple client applications to identify and access the shared data stream associated with the shared resource. In an embodiment, multiple client applications query the shared resource API to identify available shared resources, such as the shared resource initialized by the server component.

In step 430, the sever component receives a request to access a shared resource in a control mode from a client application via the shared resource API. The client application being a controlling application seeking exclusive control access to the shared data stream associated with the shared resource by seeking read-write access to control parameters associated with the shared resource. In an embodiment, a client component (e.g. client component 245) in the controlling application's process space is initialized prior to the server component receiving the request. In an embodiment, a client component is initialized by the controlling application.

In response to the request, a controlling connection is established between the server component and the client application via the shared resource API, in step 440. A client context component (e.g. client context component 320) representing the controlling application in the server component's process space is initialized in establishing the controlling connection. The shared data stream associated with the shared resource is provided to the controlling application via the controlling connection. Furthermore, read-write access to control parameters associated with the shared resource is enabled for the controlling connection. In an embodiment, a server component initializes a client context component in response to a request from the controlling application. In an embodiment, a client component is a client-side endpoint of a controlling connection and a corresponding client context component is a server-side endpoint of the controlling connection.

In step 450, the server component receives a command that modifies the shared resource via the controlling connection from the controlling application. In an embodiment, a client component issues the command, which is directed to a control parameter exposed by the corresponding shared resource component. In optional step 460, the server component interacts with a synchronization component (e.g. synchronization component 350) prior to forwarding the command for implementation. In an embodiment, the command is implemented by a driver associated with the shared resource. In an embodiment, the server component refrains from forwarding the command to the shared resource until the controlling application's client context component acquires a synchronization object from the synchronization component.

In step 470, the server component provides a modified shared data stream to the multiple client applications via the shared resource API. The modified shared data stream corresponding data provided by the shared resource after implementing the command from the controlling application. In an embodiment, a stream source component associated with the shared resource implements a controlling application's command by interacting with underlying kernel mode components.

Figure 5:
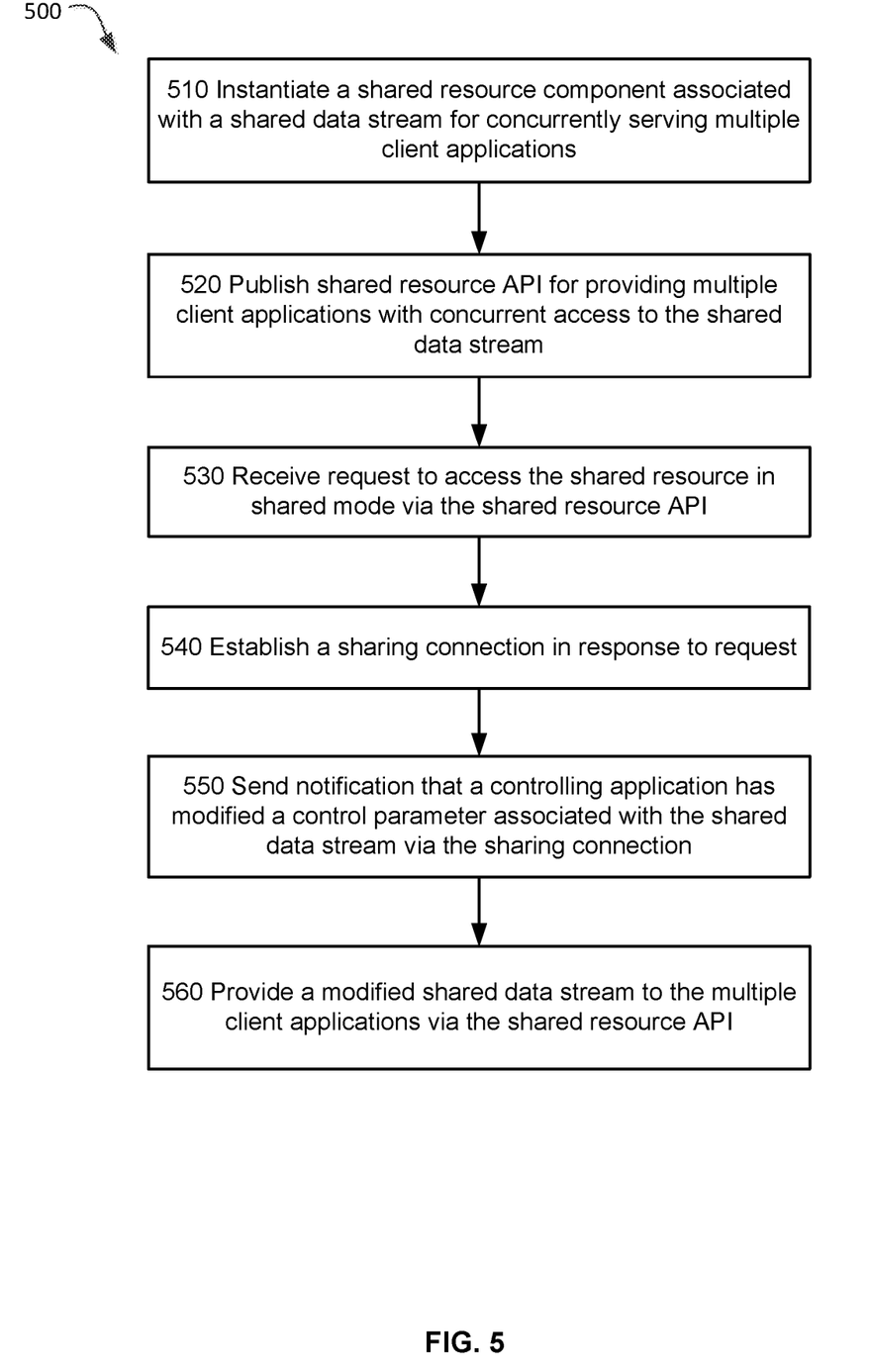
FIG. 5 depicts an embodiment of a method for arbitrating control access among multiple client applications concurrently consuming a shared data steam associated with a shared resource.

FIG. 5 depicts an embodiment of a method 500 for arbitrating control access to a shared resource concurrently serving multiple applications. In embodiments, method 500 may also be effectuated by server component 220 of FIG. 2, as it arbitrates access control to shared resource (e.g. shared resources 230A and 230B) among multiple client applications (e.g. client applications 240A-240C). In step 510, a server component instantiates a shared resource component (e.g. shared resource component 330 of FIG. 3) representing a shared resource and associated shared data streams. The shared resource configured to generate data associated with a shared data stream for concurrently serving multiple client applications. In an embodiment, instantiating the shared resource component includes the server component acquiring exclusive control of the shared resource.

In step 520, the server component publishes a shared resource API for providing multiple client applications with concurrent access to the shared data stream associated with the shared resource. In step 530, the sever component receives a request to access the shared resource in a shared mode from a client application via the shared resource API. The client application being a sharing application seeking read-only access to control parameters associated with the shared resource. In an embodiment, the server component receives the request to access the shared resource in shared mode in response to notifying the client application that another client application is accessing the shared resource in control mode.

In response to the request, a sharing connection is established between the server component and the client application via the shared resource API, in step 540. A client context component (e.g. client context component 320) representing the sharing application in the server component's process space is initialized in establishing the sharing connection. The shared data stream associated with the shared resource is provided to the sharing application via the controlling connection. Furthermore, read only access to control parameters associated with a stream source component associated with the shared data stream is provided for the sharing connection. In an embodiment, a server component initializes a client context component in response to a request from the sharing application. In an embodiment, a client component is a client-side endpoint of a controlling connection and a corresponding client context component is a server-side endpoint of the sharing connection.

In step 550, the server component notifies the client application that a controlling application has modified a control parameter associated with the shared resource via the sharing connection. In an embodiment, the server component receives notice that the client application intends to close the shared connection in response to the notice that the control parameter was modified. In step 560, the server component provides a modified shared data stream to the multiple client applications via the shared resource API.

Figure 6:
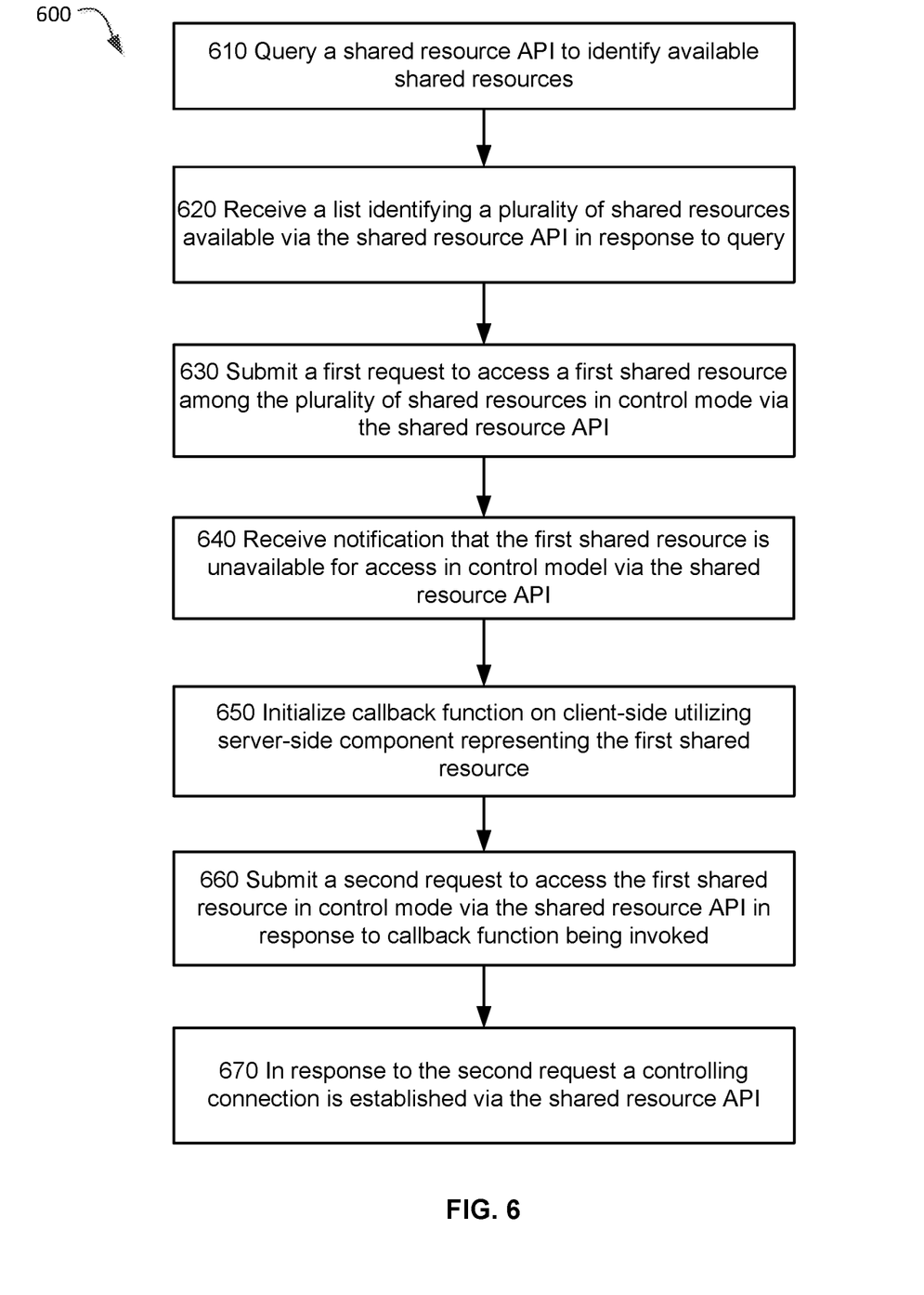
FIG. 6 depicts an embodiment of a method for arbitrating control access among multiple client applications concurrently consuming a shared data steam associated with a shared resource.

FIG. 6 depicts an embodiment of a method 600 for arbitrating control access to a shared resource concurrently serving multiple applications. In step 610, a client application queries a shared resource API published by a server component to identify shared resources. In step 620, the client application receives a list identifying a plurality of shared resources available via the shared resource API from the server component in response to the query. In an embodiment, the list of shared data streams includes information regarding capabilities and attributes corresponding to each shared resource among the plurality of shared resources composing the list.

In step 630, in response to receiving the list, the client application submits a first request to access a shared resource among the plurality of shared resources in control mode to the server component via the shared resource API. In step 640, the client application receives a notification via the shared resource API that the shared resource is currently unavailable for access in control mode. In an embodiment, the response is received from a synchronization component (e.g. synchronization component 350) of the server component.

In step 650, the client application initializes a callback function on client-side utilizing a server-side component representing the requested shared resource (e.g. stream source component 340 of FIG. 3). In an embodiment, a callback function initialized by the client application is invoked when the requested shared resource becomes available for access in control mode. In an embodiment, a callback function initialized by the client application is invoked when a particular control parameter associated with the requested shared resource becomes available for access in control mode. In an embodiment, a shared resource becomes available for access in control mode upon being released by another client application among the multiple applications.

In step 660, in response to the callback function being invoked, the client application submits a second request to access the requested shared resource in control mode to via the shared resource API. In response to the second request, a controlling connection is established between the server component and the client application via the shared resource API, in step 670.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium. The terms "circuitry", "component", or "module" are used interchangeably throughout and include hardware components such as hardware interrupt controllers, hard drives, network adaptors, graphics processors, hardware based video/audio codecs, and the firmware used to operate such hardware. The terms "circuitry", "component", or "module" can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s).

In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The previous description of the aspects is provided to enable a person skilled in the art to make or use the aspects. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A system comprising:
one or more processors; and
a memory comprising instructions that, when executed by the one or more processors, cause the system to at least:
instantiate a shared resource component representing a shared physical device and configured to generate a shared data stream to multiple client applications running on the system, the shared physical device subject to exclusive control by one of the client applications and comprising control parameters that modify aspects of the shared data stream, the shared resource component comprising a virtual abstraction of the shared physical device;
receive a first request to access the shared data stream and control the shared physical device from a first client application;
receive a second request for read-only access to the shared data stream by a second client application; and
in response to receiving the first and second requests:
allowing the first client application to concurrently consume the shared data stream with the second client application while allowing the first client application to update the control parameters; and
allow the second client application to access the shared data stream as controlled by the first client application.

2. The system of claim 1, further comprising instructions that when executed by the one or more processors further cause the system to at least:

publish a shared resource interface configured to allow the multiple client applications to access the shared data stream and control the shared physical device via control parameters;

establish a controlling connection with the first client application that allows the concurrent consumption of the shared data stream with the second client application via the shared resource interface;

wherein the controlling connection provides the first client application with read/write access to update the control parameters; and receive a command directed to the control parameters that modify the shared data stream from the first client application via the controlling connection.

3. The system of claim 2, wherein the shared resource component further comprises a mapping between an output of the shared physical device and the shared data stream.

4. The system of claim 2, wherein the shared resource component further comprises a mapping between an output of a logical data source and the shared data stream.

5. The system of claim 2, wherein establishing the controlling connection includes creating a client context component corresponding to the controlling connection, the client context component including information about the controlling connection, the first client application, the shared data stream, the shared physical device, or a combination thereof.

6. The system of claim 2, wherein the control parameters include capabilities representing mutable properties associated with the shared physical device.

7. A method for arbitrating control access, the method comprising:

instantiating a shared resource component representing a shared peripheral subject to exclusive control and configured to generate a shared data stream to multiple client applications, the shared resource component comprising control parameters that represent a configuration of the shared peripheral and usable to modify aspects of the shared data stream, shared resource component comprising a virtual abstraction of the shared peripheral;

receiving a first request to access the shared data stream in shared mode from a first client application, receive a second request for access to the shared data stream by a second client application; and in response to receiving the first and second requests, establishing a sharing connection with the first client application for concurrently consuming the shared data stream with the second client application, the sharing connection providing the first client application with read-only access to the control parameters.

8. The method of claim 7, wherein a client component serves as a client-side endpoint of the sharing connection, the client component representing the shared peripheral and the shared data stream in the first client application's process space.

9. The method of claim 8, wherein the client component serves as a client-side endpoint of the sharing connection, the client component representing the shared peripheral and the shared data stream in the first client application's process space.

10. The method of claim 8, wherein the client component is a proxy object encapsulating data associated with the shared data stream for marshalling between the first client application's process space and a process space of a server.

11. The method of claim 8, wherein the client component communicates with a server-side endpoint of the sharing connection in a server component's process space using remote method invocations.

12. The method of claim 7, further comprising:

sending a notification to the first client application via the sharing connection that the second client application has modified the control parameters associated with the shared data stream.

13. The method of claim 12, wherein the first client application, in response to receiving the notification, terminates the sharing connection in response to determining that the control parameters as modified by the second client application results in the shared data stream failing to satisfy a predetermined minimum threshold.

14. The method of claim 12, wherein the first client application, in response to receiving the notification, continues to consume the shared data stream in response to determining that the control parameters as modified by the second client application results in the shared data stream meeting a predetermined minimum threshold.

15. The method of claim 7, wherein the shared peripheral comprises one or more of a camera, microphone, video recorder, or sensor.

16. A system comprising:

one or more processors;

a shared resource coupled to the system or executing on the system, the shared resource subject to exclusive control that generates data associated with a shared data stream concurrently consumed by multiple client applications, the shared data stream originating from one or more physical devices; and a memory comprising instructions that, when executed by the one or more processors, cause the system to at least:

expose the shared resource and the shared data stream as a virtual abstraction to the multiple client applications, the multiple client applications including a first client application and a second client application;

receive a first request to access the shared resource in control mode from the first client application, the shared resource being accessed by the second client application via a shared resource interface in control mode, the shared resource interface representing the virtual abstraction; and send a notification to the first client application that the shared resource is currently unavailable for access in control mode.

17. The system of claim 16, wherein the shared resource interface is configured to receive control parameters associated with the shared data stream that represent a configuration of the shared resource, the control parameters usable to modify aspects of the shared data stream;

the system further comprising instructions that when executed by the one or more processors further cause the system to at least:

receive a second request to access the shared resource in shared mode from the first client application; and establish, in response to the second request, a sharing connection with the first client application for concurrently consuming the shared data stream with the second client application via the shared resource interface, the sharing connection providing the first client application with read-only access to the control parameters, wherein the first client application initializes a callback function utilizing a server-side component, the callback function being invoked when the shared resource becomes available for access in control mode.

18. The system of claim 17, further comprising instructions that when executed by the one or more processors further cause the system to at least:
 invoke the callback function upon determining that the second client application released the shared resource to notify the first client application that the shared resource is available for access in control mode;
 in response to invoking the callback function, receive a third request to access the shared resource in control mode from the first client application via the shared resource interface; and
 establish, in response to the third request, a controlling connection with the first client application.

19. The system of claim 17, further comprising a mapping between output data pins associated with multiple discrete data sources and the shared data stream, the multiple discrete data sources including a visible spectrum image device, a depth image device, a process generating an N-point skeletal data stream, or a combination thereof.

\* \* \* \* \*